US008533467B2

(12) United States Patent
Little et al.

(10) Patent No.: US 8,533,467 B2
(45) Date of Patent: Sep. 10, 2013

(54) SYSTEM AND METHOD OF MOBILE LIGHTWEIGHT CRYPTOGRAPHIC DIRECTORY ACCESS (75) Inventors: Herbert Anthony Little, Waterloo (CA); Dale J. Hobbs, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/535,777

(22) Filed: Jun. 28, 2012

(65) Prior Publication Data

US 2012/0265869 A1 Oct. 18, 2012

Related U.S. Application Data (60) Continuation of application No. 12/881,523, filed on Sep. 14, 2010, now Pat. No. 8,239,675, which is a division of application No. 10/508,186, filed as application No. PCT/CA03/00407 on Mar. 20, 2003, now Pat. No. 7,822,971.

(60) Provisional application No. 60/365,519, filed on Mar. 20, 2002.

(51) Int. Cl.
*H04L 29/06* (2006.01)
*G06F 17/30* (2006.01)

(52) U.S. Cl.
USPC ........................... 713/165; 707/999.1

(58) Field of Classification Search
USPC ........................... 713/153; 707/999.1
See application file for complete search history.

(56) References Cited

U.S. PATENT DOCUMENTS

| 6,073,175 | A | 6/2000 | Tavs et al. |
| 6,510,464 | B1 * | 1/2003 | Grantges et al. ............. 709/225 |
| 6,930,984 | B1 * | 8/2005 | Nomura et al. ............. 370/254 |
| 6,978,367 | B1 | 12/2005 | Hind et al. |
| 2002/0059519 | A1 | 5/2002 | Yamagishi et al. |
| 2002/0165960 | A1 | 11/2002 | Chan |
| 2002/0184182 | A1 * | 12/2002 | Kwan ............................ 707/1 |
| 2003/0088656 | A1 * | 5/2003 | Wahl et al. .................... 709/223 |

(Continued)

FOREIGN PATENT DOCUMENTS

| EP | 1113648 A2 | 7/2001 |
| EP | 1176785 A1 | 1/2002 |

OTHER PUBLICATIONS

International Search Report of Application No. PCT/CA03/00407, date of Mailing Jul. 29, 2003.

(Continued)

*Primary Examiner* — Techane Gergiso
(74) *Attorney, Agent, or Firm* — Ridout & Maybee LLP (57) ABSTRACT A system for handling an LDAP service request to an LDAP server for an LDAP service comprises a client program executable on a client system and a handler program executable on a handler system. The client program is operable to generate LDAP service request data corresponding to the LDAP service and provide the LDAP service request data for transmission from the client system, and further operable to receive LDAP service reply data in response to the LDAP service request data. The handler program is operable to receive the LDAP service request data transmitted from the client system and execute the LDAP service request to the LDAP server, receive LDAP service reply data from the LDAP server during one or more passes, and upon completion of the LDAP service, provide the LDAP service reply data for transmission to the client system in a single pass.

20 Claims, 10 Drawing Sheets

(56) References Cited

U.S. PATENT DOCUMENTS

| | | | |
|---|---|---|---|
| 2003/0172145 A1* | 9/2003 | Nguyen | 709/223 |
| 2003/0212738 A1* | 11/2003 | Wookey et al. | 709/203 |
| 2005/0086300 A1* | 4/2005 | Yeager et al. | 709/204 |

OTHER PUBLICATIONS

Glomop Group; "GloMop: Global Mobile Computing by Proxy", Sep. 13, 1995; XP-002094009, pp. 1-12.

Zenel, B. et al.; "Intelligent Communication Filtering for Limited Bandwidth Environments", May 4, 1995, XP-002094011, 7 pages.

Fox, A. et al.; "Reducing Www Latency and Bandwidth Requirement by Real-Time Distillation", vol. 28, No. 11; May 1, 1996; pp. 1445-1456.

Luotonen, A. et al.; "World-Wide Web Proxies", vol. 27, No. 2; Nov. 1, 1994; pp. 147-154.

Modi, Vipul; "LDAP Extensions for Proxy Connection; draft-vmodi-idapext-proxy-connect-00.txt"; Standard working draft, Internet Engineering Task Force, IETF, CH, Aug. 5, 1999; XP-015036558.

Extended European Search Report, issued Oct. 15, 2008, for European Application No. 06121913.5.

* cited by examiner

SYSTEM AND METHOD OF MOBILE LIGHTWEIGHT CRYPTOGRAPHIC DIRECTORY ACCESS

This application is a continuation of U.S. patent application Ser. No. 12/881,523, filed Sep. 14, 2010 now U.S. Pat. No. 8,239,675 which is a divisional application of U.S. patent application Ser. No. 10/508,186 filed Sep. 17, 2004, which issued as U.S. Pat. No. 7,822,971 on Oct. 26, 2010, which is a National Phase entry of International Application No. PCT/CA03/00407 filed Mar. 20, 2003 and claims benefit of and priority to U.S. Provisional Patent Application Ser. No. 60/365,519 filed Mar. 20, 2002, all of which are incorporated herein by reference.

BACKGROUND

1. Technical Field

The present invention is directed toward a system and method of handling a database service request to a database server for a database service. In particular, the system and method is directed to enabling cryptographic information stored in database servers to be sent to a mobile data communication device ("mobile device") for cryptographic e-mail messaging.

2. Description of the Related Art

A cryptographic e-mail message can be a signed message, an encrypted message, or a signed and encrypted message. Standards supporting cryptographic messaging include Secure Multipurpose Internet Mail Extensions (S/MIME), Pretty Good Privacy™ (PGP™), OpenPGP and other secure e-mail standards and protocols. Cryptographic information, such as digital certificates, public keys, and the like, is often stored in a server accessible over a network, such as a Lightweight Directory Access Protocol (LDAP) server. When a cryptographic message is to be sent by a user of a computer device, the cryptographic information, such as a public key corresponding to a recipient's e-mail address, may not be directly available to the user. The cryptographic information may instead be obtained by querying the directory of an LDAP server.

On a desktop system, the sender may, for example, use a browser program to perform a multi-pass query with the LDAP server to select specific cryptographic information from the LDAP server. Some actions available to a desktop user, however, may not be available to a mobile device user. Furthermore, LDAP queries can return large responses that may exceed the storage capacity of the mobile device, as well as exceed the bandwidth capacity of a wireless network if the mobile device is configured for wireless data communication over the wireless network.

SUMMARY

A system for handling an LDAP service request to an LDAP server for an LDAP service comprises a client program executable on a client system and a handler program executable on a handler system. The client program is operable to generate LDAP service request data corresponding to the LDAP service and provide the LDAP service request data for transmission from the client system, and further operable to receive LDAP service reply data in response to the LDAP service request data. The handler program is operable to receive the LDAP service request data transmitted from the client system and execute the LDAP service request to the LDAP server, receive LDAP service reply data from the LDAP server during one or more passes, and upon completion of the LDAP service, provide the LDAP service reply data for transmission to the client system in a single pass.

Another system for handling an LDAP service request to an LDAP server for an LDAP service comprises a handler program executable on a handler system. The handler program is operable to receive LDAP service request data corresponding to the LDAP service request and execute the LDAP service request to the LDAP server, receive LDAP service reply data from the LDAP server during one or more passes, throttle the LDAP service reply data to generate throttled LDAP service reply data if the LDAP service reply data exceeds a threshold, and provide the LDAP service reply data or the throttled LDAP service reply for transmission to the client system in a single pass.

A method for handling an LDAP service request to an LDAP server for an LDAP service comprises the steps of receiving LDAP service request data transmitted from a client system, executing at the client system the LDAP service request to the LDAP server, receiving LDAP service reply data from the LDAP server during one or more passes during execution of the LDAP service, and transmitting the LDAP service reply data received at the handler system to the client system in a single pass.

DETAILED DESCRIPTION

Figure 1A:
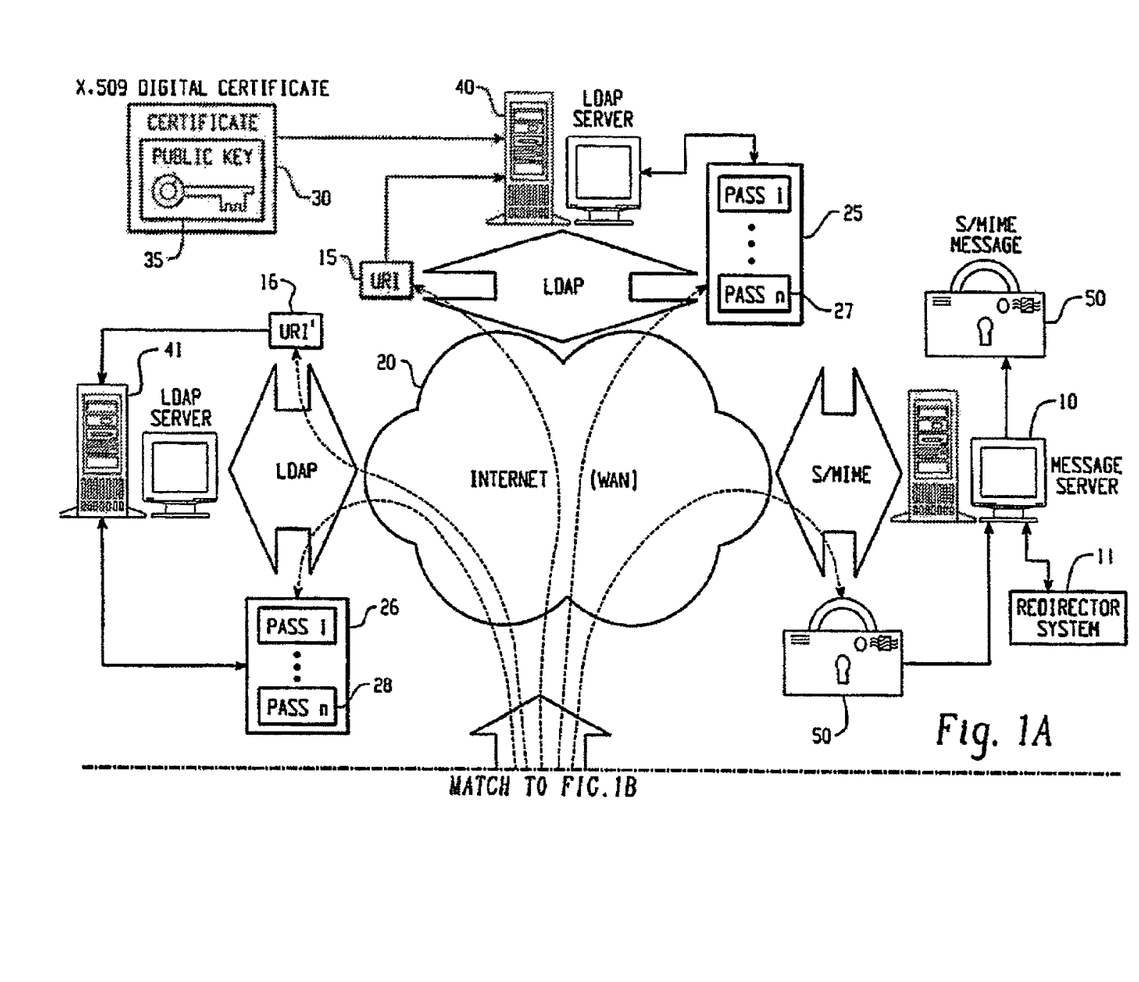
FIGS. 1A and 1B provide a block diagram of an illustrative communication system in which an LDAP service request is processed.
Figure 1B:
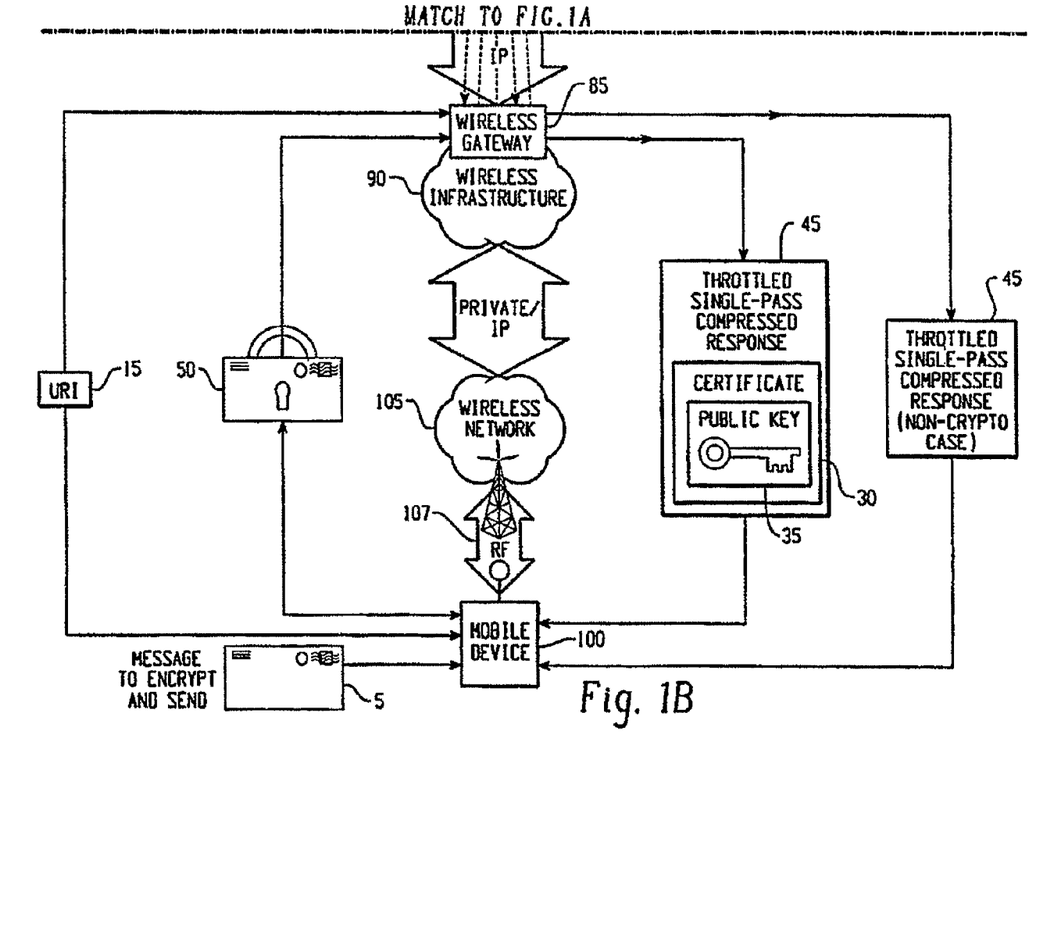

FIGS. 1A and 1B provide a block diagram of an illustrative communication system in which an LDAP service request is processed. The communication system comprises a message server 10, the Internet 20, an LDAP server 40, a wireless gateway 85, a wireless infrastructure 90, a wireless network 105, and a mobile device 100. The LDAP server 40 is illustratively configured to provide cryptographic information, such as an X.509 digital certificate 30. The message server 10 operates a message server software module, such as an S/MIME server, and is configured to send and receive S/MIME messages such as S/MIME message 50.

The message server 10 may be connected to a carrier or an Internet Service Provider (ISP). The user may have an account on the message server 10 so that the user may send and receive electronic messages, such as e-mail and the like.

Of course, the communication system components shown in FIG. 1 may alternatively be connected to a wide area network (WAN) other than the Internet, such as a company-wide WAN.

The message server 10 and the LDAP server 40 may be implemented on one or more network computers protected by a firewall program, one or more computers within an ISP or Application Service Provider (ASP) system or the like, and provide e-mail and LDAP services. Servers such as the message server 10 and the LDAP server 40 may also include dynamic database storage engines that have predefined database formats for calendar data, to-do lists, task lists, e-mail, addresses, documentation, and the like.

The wireless gateway 85 and the wireless infrastructure 90 provide a link between the Internet 20 and the wireless network 105, and collectively form an exemplary mobile information transfer mechanism. The wireless infrastructure determines the most likely network for locating a given mobile device 100 and tracks the mobile device 100 as it roams between countries or networks.

The particular wireless network 105 may be virtually any wireless network over which information may be exchanged with a mobile device. For example, the wireless network may be a data-centric wireless network, a voice-centric wireless network, or a dual-mode network that can support both voice and data communications over the same physical base stations. Exemplary combined dual-mode networks include the Code Division Multiple Access (CDMA) network, the Groupe Special Mobile or the Global System for Mobile Communications (GSM) and the General Packet Radio Service (GPRS) network, and third-generation (3G) networks such as Enhanced Data-rates for Global Evolution (EDGE) and Universal Mobile Telecommunications Systems (UMTS). Examples of data-centric networks include the Mobitex™ Radio Network, and the DataTAC™ Radio Network. Examples of voice-centric data networks include Personal Communication Systems (PCS) networks like CDMA, GSM, and TDMA systems.

For each type of wireless network 105 and the specific information transfer mechanism controlling the forwarding and sending of data items to and from the mobile device 100, data items, such as e-mail messages, are sent via the wireless gateway 85 to the mobile device 100. An exemplary mobile device 100 may be of the type disclosed in U.S. Pat. No. 6,278,442, entitled "HAND-HELD ELECTRONIC DEVICE WITH A KEYBOARD OPTIMIZED FOR USE WITH THE THUMBS," the entire disclosure of which is incorporated herein by reference. The data items may be sent to the wireless gateway 85 via a redirector system 11 in communication with the message server 10. An exemplary redirection system may be of the type disclosed in U.S. Pat. No. 6,219,694, entitled "SYSTEM AND METHOD FOR PUSHING INFORMATION FROM A HOST SYSTEM TO A MOBILE DATA COMMUNICATION DEVICE HAVING A SHARED ELECTRONIC ADDRESS," the entire disclosure of which is incorporated herein by reference.

The wireless infrastructure 90 includes a series of connections to the wireless network 105. These connections can be an Integrated Services Digital Network (ISDN) connection, a Frame Relay connection, or a T1 connection using the TCP/IP protocol.

As shown in FIG. 1, the mobile device 100 sends a Uniform Resource Identifier (URI) 15 corresponding to a resource request from the LDAP server 40. The URI 15 is, for example, an LDAP query for an X.509 digital certificate 30 containing a public key 35. The public key 35 is required to encrypt the e-mail message 5 and send the S/MIME message 50. The wireless gateway 85 receives the URI 15 and a handler program executed at the wireless gateway 85 performs a traditional LDAP query on behalf of mobile device 100. The URI 15 arrives at the LDAP server 40, which in turn responds by sending a multi-pass response 25 to the requesting client. The multi-pass response 25 may comprise multiple exchanges of data during multiple passes 27.

The multi-pass response 25 comprises a normal information exchange between the LDAP server 40 and the client. In this particular embodiment, the wireless gateway 85 includes a handler program that manages the LDAP query from the mobile device 100. Thus, the requesting client is the wireless gateway 85. Traditional LDAP communication techniques are used between the wireless gateway 85 and LDAP server 40.

As illustrated, information retrieval is performed via a query directed to the LDAP server 40 via the URI 15. The LDAP server 40 returns the response 25, which includes any results or errors, directly to the requesting client that transmitted the query via the URI 15, which in this embodiment is the wireless gateway 85. Typically, the LDAP server 30 responds in multiple passes 27.

Although LDAP server 40 is required to return responses whenever such responses are defined, the LDAP server 40, and the wireless gateway 85, which is functioning as an LDAP client, are not required to communicate synchronously. This results in the multi-pass response 25 being "chatty" and is not conducive to conducting an LDAP query with the mobile device 100 as the LDAP client, as the wireless network 105 and the RF link 107 are of relatively limited bandwidth and high latency as compared to the Internet 20.

The LDAP server 40 provides a directory service over the Internet 20 whereby information, such as e-mail addresses, contact information, and cryptographic information may be retrieved. One example of such information is a digital certificate 30 having a public key 35, which can be retrieved via a query on a Directory Information Tree (DIT) served by one or more LDAP servers 40 and 41. Furthermore, since a DIT can be jointly provided by one or more LDAP servers 40 and 41, the LDAP server 40 may respond to the URI 15 with a referral URI 16 directed to the LDAP server 41. The LDAP server 41 will issue a response 26 to the wireless gateway 85 functioning as the LDAP client in an analogous manner as the LDAP server 40 responds to the URI 15, i.e., the response 26 may comprise multiple passes 28. This referral may make the LDAP exchange even more chatty.

The wireless gateway 85 receives the URI query 15 from the mobile device 100, performs the query on behalf of mobile device 100, and responds to the mobile device 100 with a single pass communication. At least one subset of the information received at the wireless gateway 85 in the traditional LDAP multi-pass response 25 is sent and delivered in the single-pass response 45 to the mobile device 100. Because the wireless network 105 communications over the RF link 107 typically have high latency as compared to communications over the Internet 20, the single-pass response 45 makes better use of resources for transmitting over a RF link 107 and wireless network 105. Thus, the wireless gateway 85 shields the wireless network 105 from the "chatty" nature of traditional LDAP communications by performing the traditional LDAP query on behalf of a mobile device 100.

In the case of cryptographic directory service, the LDAP server 40 is used to obtain a digital certificate 30 having a public key 35 required to encrypt an e-mail message 5. Different cryptographic standards may be used in the communication system, resulting in different types of cryptographic information being received. For example, in the case of X.509 cryptographic information, the LDAP server 30 may provide one or more attributes, such as "userCertificate", "cACertificate", "authorityRevocationList", "certificateRevocationList", "crossCertificatePair", "supportedAlgorithms", and "deltaRevocationList".

The data are usually transmitted over the wireless network 105 in binary form, and the response 25 to the URI 15 may comprise a relatively large amount of data. For example, a query for a digital certificate 30 comprising a long certification path may yield a response that includes the certification authority (CA) certificates signed by multiple authorities up to a root CA, or may return more than one certificate. Therefore, in addition to the traditional LDAP response 25 received by the wireless gateway 85 being chatty, the response 25 may also be too large for the relatively limited bandwidth of wireless network 85. Furthermore, if the mobile device 100 has a limited memory store, data from the response 25 may also exceed the limited capacity of memory store of the mobile device 100.

Thus, the single-pass response 45 may also be "throttled" and compressed to compensate for the low bandwidth of the wireless network 105 and the RF link 107. Accordingly, the wireless gateway 85 shields the wireless network 105 and the RF interface 107 from an LDAP server response comprising a large amount of data.

Thus, when the wireless gateway 85 sends a URI query 15 for cryptographic information on behalf of the mobile device 100, then the mobile device 100 receives the single-pass throttled and compressed response 45 suitable for the low bandwidth, high latency wireless network 105 and RF link 107. The mobile device 100 is thus enabled to encrypt the e-mail message 5, and is thereby able to send a cryptographic message 50 using cryptographic information obtained over the wireless network 105 and RF link 107.

Figure 2:
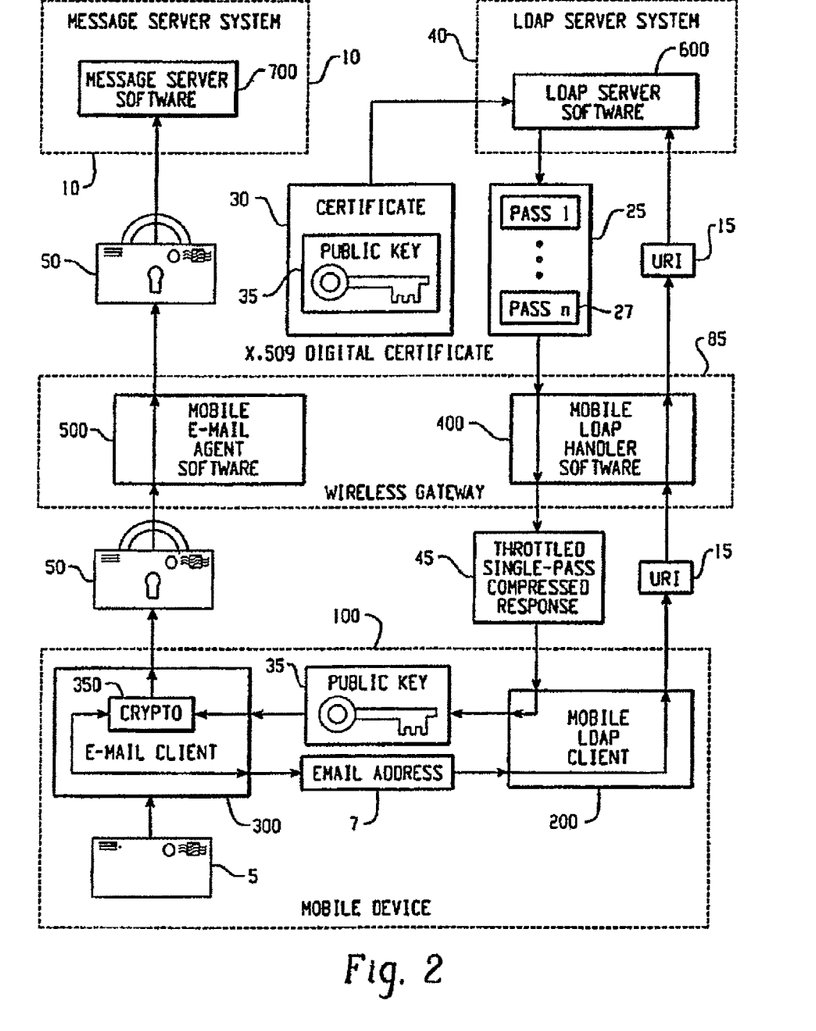
FIG. 2 illustrates a system for handling an LDAP service request to an LDAP server.

FIG. 2 illustrates in greater detail a system for handling an LDAP service request to an LDAP server. The mobile device 100 is configured to operate an LDAP client software module 200, and an e-mail client software module 300 having a cryptographic processing block 350. The wireless gateway 85 is configured to operate an LDAP handler software module 400 and mobile e-mail agent software module 500. The message server system 10 is configured to operate a message server software module 700, such as an S/MIME server software. The LDAP server system 40 is configured to operate an LDAP server software module 600.

The message server system 10, the LDAP server system 40, and the wireless gateway 85 may be implemented on any variety of computing devices, such as a computer having one or more processors, a memory storage subsystem, and one or more network interface cards configured to communicate over the networks illustrated in FIG. 1. An exemplary mobile device is as previously described and as further described below with reference to FIG. 4.

A user of the mobile device 100 may compose, reply to, or forward an e-mail message 5 to another user having an account on the message server system 10. The e-mail message 5 is to be encrypted into an S/MIME message 50 according to the S/MIME standard. However, the crypto block 350 requires at least one public key 35 corresponding to a private key of the recipient of the e-mail message 5. The public key 35, however, is not stored in a memory store of the mobile device 100, and thus the user of the mobile device 100 must send a query to an LDAP server 40 to obtain the public key 35.

The e-mail client 300 provides an e-mail address 7, or alternatively a common name or other user information, corresponding to the intended recipient(s) of the e-mail message 5 to the LDAP client 200, which in turn formulates a URI 15 that requests the digital certificate 30 corresponding to the recipient. The URI 15 is transmitted to the wireless gateway 85, and the LDAP handler software 400 executes the LDAP query to the LDAP server 40. The LDAP server software 600 receives the URI 15 and provides the multi-pass response 25, which includes the digital certificate 30, back to the wireless gateway 85. Upon completion of the LDAP query, the wireless gateway 85 transmits the digital certificate 30 to the mobile device 100 in a single pass.

Figure 3:
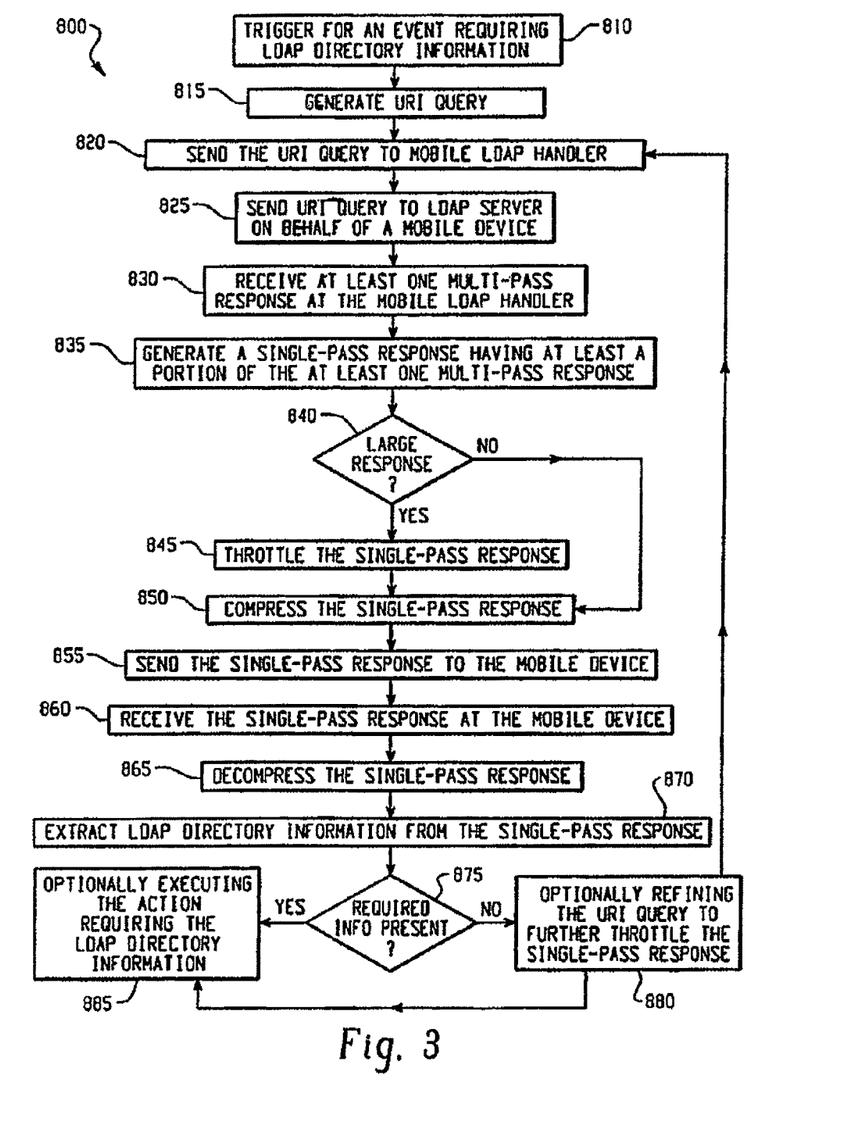
FIG. 3 provides a flow chart of an illustrative method for handling an LDAP service request.

FIG. 3 provides a flow chart of an illustrative method 800 for handling an LDAP service request. At step 810, the mobile device 100 receives a trigger for an event requiring LDAP directory information. The trigger in the exemplary embodiment described with reference to FIGS. 1 and 2 is an encryption command to encrypt an e-mail message 5. As previously described, the encryption operation requires the public key 35 of the digital certificate 30, which is stored at the LDAP server 40. Of course, other events may also be used to trigger other LDAP services, such as acquiring an e-mail address, contact information, or other data stored in the LDAP server 40.

In step 815, a URI query is generated. The query is illustratively a standard LDAP query. The URI may include known LDAP data such as the protocol prefix "ldap://"; a domain name host such as the domain name for a root CA, such as "directory.ldap40.com" corresponding to the internet address of the LDAP server 40; an optional port number over which a stream is initiated, such as the default port ":389", and optional base query DN followed by other known LDAP query parameters. Thus an example URI generated by the mobile device 100 would be "ldap://directory.ldap40.com:389/{optional parameters}".

In step 820, the URI 15 query is sent to the LDAP handler 400 at the wireless gateway 85. Note that the URI 15 query is not sent directly to the Internet address corresponding to domain name "directory.ldap40.com", but instead is sent to the wireless gateway 85 for further processing by LDAP handler software 400. This can be accomplished by sending the URI 15 query as payload data in a communication directed to the wireless gateway 85, for example. Other methods for directing the URI 15 query to the LDAP handler software 400 at the wireless gateway 85 may also be used.

In step 825, the URI 15 query is sent to an LDAP server 40 by the LDAP handler 400 on behalf of a mobile device 100. Thus, once the LDAP handler 400 receives the URI 15 query, the URI 15 query is sent to the Internet address corresponding to the domain name in the URI 15. Continuing with the example, the URI 15 query is sent to the Internet address corresponding to "directory.ldap40.com". At this step, the LDAP handler 400 functions as a traditional LDAP client in order to shield the wireless network 85 and the RF link 107 from the chatty and bulky LDAP communication.

In step 830, at least one multi-pass response 45 is received at the LDAP handler 400. The LDAP handler 400 continues to function as a traditional LDAP client up until the response is received, at which point the next step 835 may begin, at which time the LDAP handler may also function as an optimized LDAP server with respect to the mobile device 100.

In step 835, a single-pass response having at least a portion of the at least one multi-pass response of step 830 is generated. By generating the single pass response 45 to the URI 15 query, the LDAP handler 400 shields the mobile device 100 from the chatty LDAP communication.

Step 840 determines if the single-pass response 45 is too large for the limited bandwidth of the wireless network 105 and the RF link 107, or for the limited storage capability of the mobile device 100. All multiple passes 27 need not be received in order to make this determination. For example, steps 830, 835 and 840 may concurrently cooperate and monitor the received LDAP data and the single pass response being generated. Then, if a URI 15 query would normally return a multi-pass response having 100 records, step 840 may determine that the response is too large after a threshold, such as a threshold number of records, has been received. The determination can thus be made before the 100 records of the multi-pass response are fully received at step 830.

If the response is determined to be large, then step 845 ensues; or else step 850 ensues.

In step 845, the single-pass response 45 is throttled. Throttling limits the data to be transmitted to the mobile device 100. For example, if a threshold number of records received is exceeded, then the LDAP handler 400 may delete the records that are subsequently received after the reception of the threshold record. Furthermore, additional refinement data may be appended to the retained records. Upon receiving the throttled single pass response, the LDAP client 200 operating in the mobile device 100 may then advise the mobile user to refine the URI query to receive subsequent or alternate records.

In step 850, the single-pass response is compressed. The single-pass response is more amenable to compression because single-pass data packets tend to be fuller than multi-pass packets—and thus more likely to have redundancies, which can be compressed, for example, by run length encoding or other known encoding schemes.

In step 860, the single-pass response is sent to the mobile device 100, and in step 860, the single pass response is received at the mobile device 100. In step 865, the single-pass response is decompressed.

In step 870, the LDAP directory information is extracted from the single-pass response. The mobile device 100 thereafter has available to it the requested information that was stored at the LDAP server 40.

In step 875, the mobile device 100 determines if the requested LDAP directory information required at step 810 was extracted at step 870. If the requested LDAP directory information is present, then step 885 ensues. If the required information is not present, then step 880 ensues.

In step 880, the URI 15 query may be refined to further throttle subsequent single-pass responses or refine the search at the LDAP server 40. This may be desirable, for example, if a record in step 845 is provided in the single-pass response advising the user to further refine the URI query after truncating the record set to within a threshold size; or if the single-pass response indicates that no data responsive to the URI 15 query is available at the LDAP server 40. If the mobile device 100 user refines the URI query, then step 820 and subsequent steps are executed anew.

In step 885, the action requiring the LDAP directory information is optionally executed. For example, a public key 35 in the digital certificate 30 can be used to encrypt the e-mail 5 into the S/MIME e-mail 50, which is then sent from the mobile device 100. The user can preferably be provided an option to not execute the action, however, such as by the mobile device 100 generating a user prompt at an I/O device. For example, the user may be prompted to confirm the encryption of e-mail message 5 using the public key 35, and/or to send the e-mail message 5 or S/MIME e-mail 50.

In an alternate embodiment, step 810 need not necessarily occur at the mobile device 100. For example, the wireless gateway 85 may also receive an S/MIME message 50 to be transmitted to the mobile device 100. If the S/MIME message 50 to be transmitted to the mobile device 100 is signed with a digital signature, the pending transmission can be a trigger event to cause LDAP handler software 400 at the wireless gateway 85 to pre-emptively query the LDAP server 40 to obtain the certificate 30 and public key 35 for the signer of the S/MIME message, as well as any certificate revocation lists or other cryptographic information required to verify the S/MIME message. The cryptographic information may then be obtained before the S/MIME message 50 is transmitted to the mobile device 100, in which case the S/MIME message 50 is stored at the wireless gateway 85. The LDAP handler software 400 may be further operable to discard the S/MIME message 50 if the signature verification fails and/or is not trusted, or alternatively transmit the digital certificate 30 retrieved with the S/MIME message 50. In another embodiment, the wireless gateway 85 is configured to verify a digital signature and transmit the S/MIME message 50 with a verification result of valid or invalid, thus conserving processing resources at the mobile device 100.

In another alternate embodiment, the redirector system 11 may store and execute the LDAP handler program. If the S/MIME message 50 to be redirected to the mobile device 100 is signed with a digital signature, the pending transmission can be a trigger event to cause LDAP handler software 400 at the redirector system 11 to pre-emptively query the LDAP server 40 to obtain the certificate 30 and public key 35 for the signer of the S/MIME message, as well as any certificate revocation lists or other cryptographic information required to verify the S/MIME message. The cryptographic information may then be obtained before the S/MIME message 50 is redirected to the mobile device 100, in which case the S/MIME message 50 is stored at the redirector system 11. The LDAP handler software 400 may be further operable to discard the S/MIME message 50 if the signature verification fails and/or is not trusted, or alternatively transmit the digital certificate 30 retrieved with the S/MIME message 50. In another embodiment, the redirector system 11 is configured to verify a digital signature and transmit the S/MIME message 50 with a verification result of valid or invalid, thus conserving processing resources at the mobile device 100.

Figure 7:
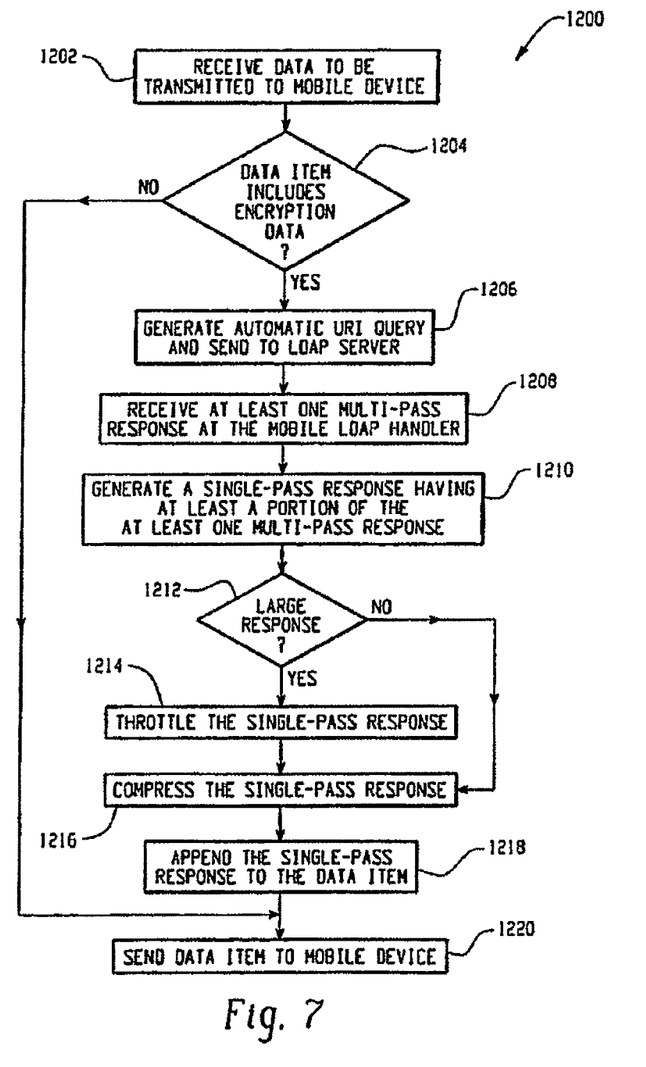
FIG. 7 provides a flow chart illustrating a process of generating and executing automatic LDAP server queries for data items to be redirected to a mobile device.

FIG. 7 provides a flow chart 1200 illustrating one such process of generating and executing automatic LDAP server queries for data items to be transmitted to a mobile device 100. The process is illustratively carried out at the wireless gateway 85 in a similar manner as described above. In step 1202, the wireless gateway 85 receives a data item to be transmitted to a mobile device 100. The data item may be, for example, an S/MIME message 50 including encryption data, such as a digital signature.

In step 1204, the wireless gateway 85 scans the data item to determine if the data item includes encryption data. If the data item includes encryption data, such as the digital signature, then step 1206 is performed; or else step 1220 is performed.

In step 1206, a URI query is generated and sent to the LDAP server 40. The query is illustratively a standard LDAP query, as described above. Steps 1208, 1210, 1212, 1214 and 1216 are then performed in a similar manner as described with reference to steps 830, 835, 840, 845 and 850 of FIG. 3. In step 1218, the single pass response is appended to the data item. Step 1220 is then executed, and the data item is sent to the mobile device 100. Because step 1218 appends the single pass response to the data item, the mobile device 100 receives all required cryptographic information from the LDAP server 40 for the verification of the data item upon initial receipt of the data item. Thus, the mobile device 100 need not generate a URI 15 query.

In another alternate embodiment, other cryptographic applications using secure socket layer (SSL), such as a web browser application, may require server and/or client certificates, certificate revocation lists, and/or other cryptographic information. Use of SSL could also be a trigger event occurring, for example, when the mobile device 100 user browses or is pushed an SSL page. The encryption information may be obtained by the mobile device 100 issuing a URI query as described above, or may alternatively be obtained by the LDAP handler 400 issuing the URI query as described above.

In another embodiment, the throttling steps and compression/decompression steps are optional. The use of compression as well as throttling allows the method to be adapted to various wireless network/mobile device combinations to ensure that an acceptable trade-off is achieved between minimizing RF bandwidth by compression, and minimizing the impact of additional mobile device processing by requiring decompression. Compression and throttling may be optionally invoked by a user of the mobile device 100, or by a system administrator, or automatically depending on the size of the single pass response.

Figure 4:
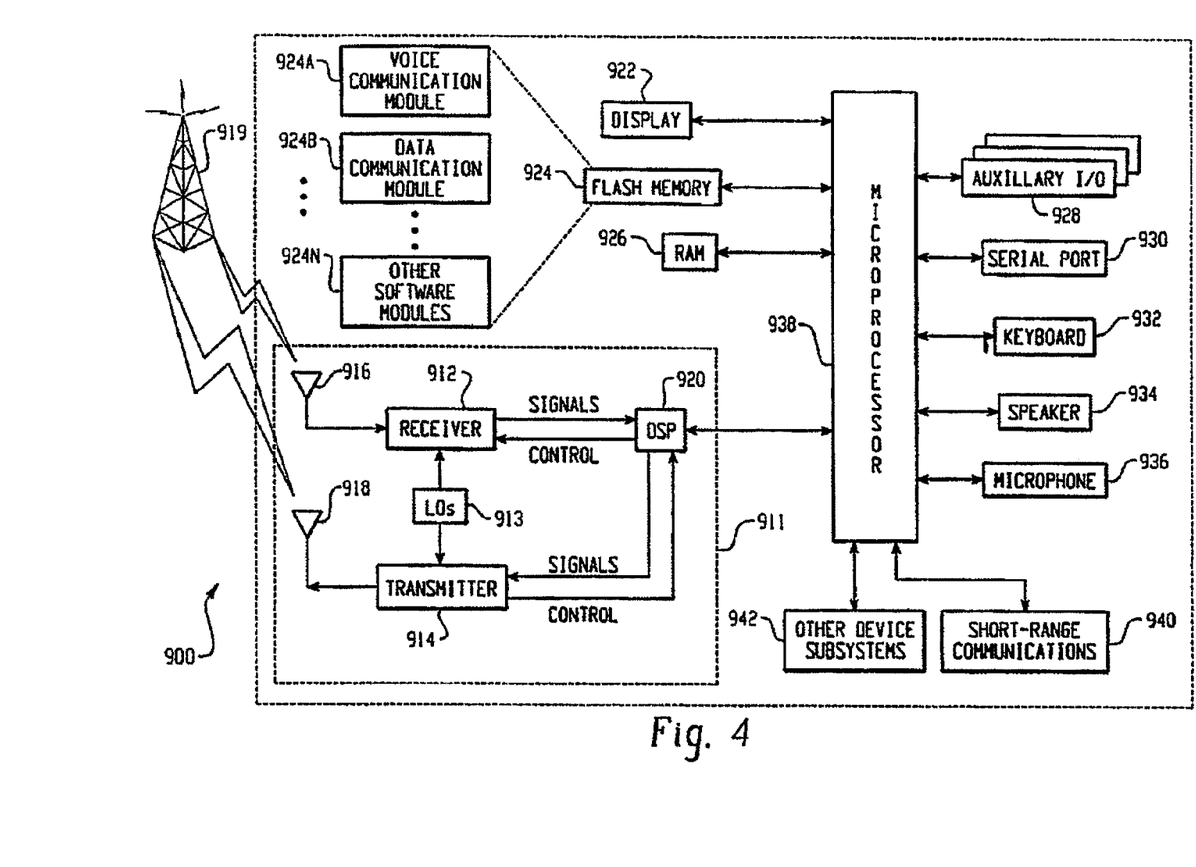
FIG. 4 is a block diagram of an illustrative client system used in a system for handling an LDAP service request, the client system comprising a mobile device.

With reference to FIG. 4, there is a block diagram of an exemplary wireless device 900 that may be used to realize the mobile device 100. The wireless device 900 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

When the device 900 is enabled for two-way communications, the device will incorporate a communication subsystem 911 including a receiver 912, a transmitter 914, and associated components such as one or more antenna elements 916 and 918, local oscillators (LOs) 913, and a processing module such as a digital signal processor (DSP) 920. The particular design of the communication subsystem 911 will be dependent upon the communication network in which the device is intended to operate. For example, a device 900 destined for a North American market may include a communication subsystem 911 designed to operate within the Mobitex mobile communication system or DataTAC mobile communication system, whereas a device 900 intended for use in Europe may incorporate a General Packet Radio Service (GPRS) communication subsystem 911.

Network access requirements will also vary depending upon the type of network 919, such as the wireless network 105 of FIG. 1. For example, in the Mobitex and DataTAC networks, mobile devices such as 900 are registered on the network using a unique personal identification number or PIN associated with each device. In GPRS networks, however, network access is associated with a subscriber or user of a device 900. A GPRS device therefore requires a subscriber identity module, commonly referred to as a SIM card, in order to operate on a GPRS network.

Signals received by the antenna 916 through a communication network 919 are input to the receiver 912, which may perform such common receiver functions as signal amplification, frequency down conversion, filtering, channel selection and the like, and analog to digital conversion. Analog to digital conversion of a received signal allows more complex communication functions such as demodulation and decoding to be performed in the DSP 920. In a similar manner, signals to be transmitted are processed, including modulation and encoding for example, by the DSP 920 and input to the transmitter 914 for digital to analog conversion, frequency up conversion, filtering, amplification and transmission over the communication network 919 via the antenna 918.

The DSP 920 not only processes communication signals, but also provides for receiver and transmitter control. For example, the gains applied to communication signals in the receiver 912 and transmitter 914 may be adaptively controlled through automatic gain control algorithms implemented in the DSP 920.

The device 900 preferably includes a microprocessor 938, which controls the overall operation of the device. Communication functions, including at least data and voice communications, are performed through the communication subsystem 911. The microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 4 perform communication-related functions, whereas other subsystems may provide "resident" or on-device functions. Notably, some subsystems, such as keyboard 932 and display 922 for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read only memory (ROM) or similar storage element. The operating system, specific device applications, or parts thereof, may be temporarily loaded into a volatile store such as RAM 926. Received communication signals and data items may also be stored to RAM 926. The flash memory 924 preferably includes data communication module 924B, and when device 900 is enabled for voice communication, voice communication module 924A. Other software modules may be stored in other flash memory modules 924N, which illustratively stores software for the LDAP client 200, e-mail client 300, and cryptographic block 350 of FIG. 2.

The microprocessor 938, in addition to its operating system functions, preferably enables execution of software applications on the device. A predetermined set of applications that control basic device operations, including at least data and voice communication applications, for example, will normally be installed on the device 900 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a one embodiment, the PIM data items are seamlessly integrated, synchronized and updated, via the wireless network, with the device user's corresponding data items stored or associated with a host computer system. Further applications may also be loaded onto the device 900 through the network 919, an auxiliary I/O subsystem 928, serial port 930, short-range communications subsystem 940 or any other suitable subsystem 942, and installed by a user in the RAM 926 or preferably a non-volatile store for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the device 900.

In a data communication mode, a received signal such as a text message or web page download will be processed by the communication subsystem 911 and input to the microprocessor 938, which will preferably further process the received signal for output to the display 922, or alternatively to an auxiliary I/O device 928. A user of device 900 may also compose data items such as e-mail messages, for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of the device 900 is substantially similar, except that received signals would preferably be output to a speaker 934 and signals for transmission would be generated by a microphone 936. Alternative voice or audio I/O subsystems such as a voice message recording subsystem may also be implemented on the device 900. Although voice or audio signal output is preferably accomplished primarily through the speaker 934, the display 922 may also be used to provide an indication of the identity of a calling party, the duration of a voice call, or other voice call related information, for example.

The serial port 930 would normally be implemented in a personal digital assistant (PDA)-type communication device for which synchronization with a user's desktop computer may be desirable, but is an optional device component. Such a port 930 would enable a user to set preferences through an external device or software application and would extend the capabilities of the device by providing for information or software downloads to the device 900 other than through a wireless communication network. The alternate download path may for example be used to load an encryption key onto the device through a direct and thus reliable and trusted connection to thereby enable secure device communication.

A short-range communications subsystem 940 is a further optional component which may provide for communication between the device 900 and different systems or devices, which need not necessarily be similar devices. For example, the subsystem 940 may include an infrared device and associated circuits and components or a Bluetooth™ communication module to provide for communication with similarly enabled systems and devices.

Figure 5:
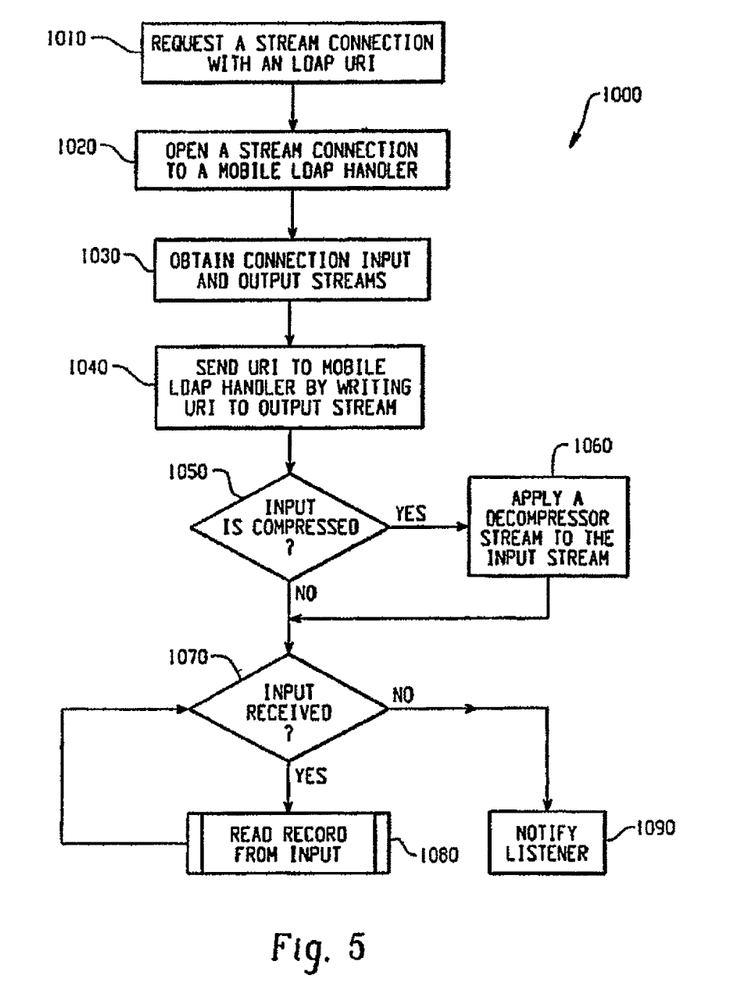
FIG. 5 provides a flow chart of an illustrative method for an LDAP client query method.

FIG. 5 provides a flow chart 1000 of an illustrative method for an LDAP client query carried out at the mobile device 100. In step 1010, a stream connection with an LDAP URI is requested. The request may be sent from any computer device in communication with the wireless gateway 85 over one or more networks. In the case of the cryptographic messaging example, the request is sent from the mobile LDAP client 200 executing on the mobile device 100.

In step 1020, a stream connection to the LDAP handler 400 is opened. By opening this connection to the LDAP handler 400 rather than the LDAP server 40, the mobile device 100 is shielded from the chatty LDAP information exchange.

In step 1030, a connection input and output stream is obtained. The LDAP handler 400 uses the output stream to receive the URI sent in the subsequent step, and the LDAP client 200 uses the input stream to receive records from the LDAP handler 400 in the single pass response.

In step 1040, the URI is sent to the LDAP handler 400 by writing the URI to the output stream. The LDAP handler 400 then proceeds to perform the multi-pass query on behalf of the mobile device 100, and returns a throttled, optionally compressed, single-pass response as previously described.

In step 1050, the mobile device 100 determines if the input stream is compressed. This determination can be made, for example, by reading a Boolean value from the input stream, written by the LDAP handler 400 to specify that the option to compress has been selected or deselected. If compression is selected, step 1060 ensues before step 1070. If compression is not selected, then step 1070 ensues.

In step 1060, a decompressor stream is applied to the input stream. The decompression can be implemented by several methods, such as by pipelining the input stream through a decompressor stream and then substituting the decompressor stream for the input stream in subsequent steps, for example.

Step 1070 determines if input stream is to receive data. This can be accomplished either by receiving a header file specifying the amount of data to be transmitted over the input stream, or by reading a Boolean value from the input stream, written by the LDAP handler 400, which specifies that either a record is forthcoming, or that all records have been sent in the single-pass response. A timeout condition may further ensure that the mobile device 100 terminates the communication after a timeout. If input is to be received, then step 1080 ensues, else if no input is to be received, then step 1090 ensues.

Figure 6:
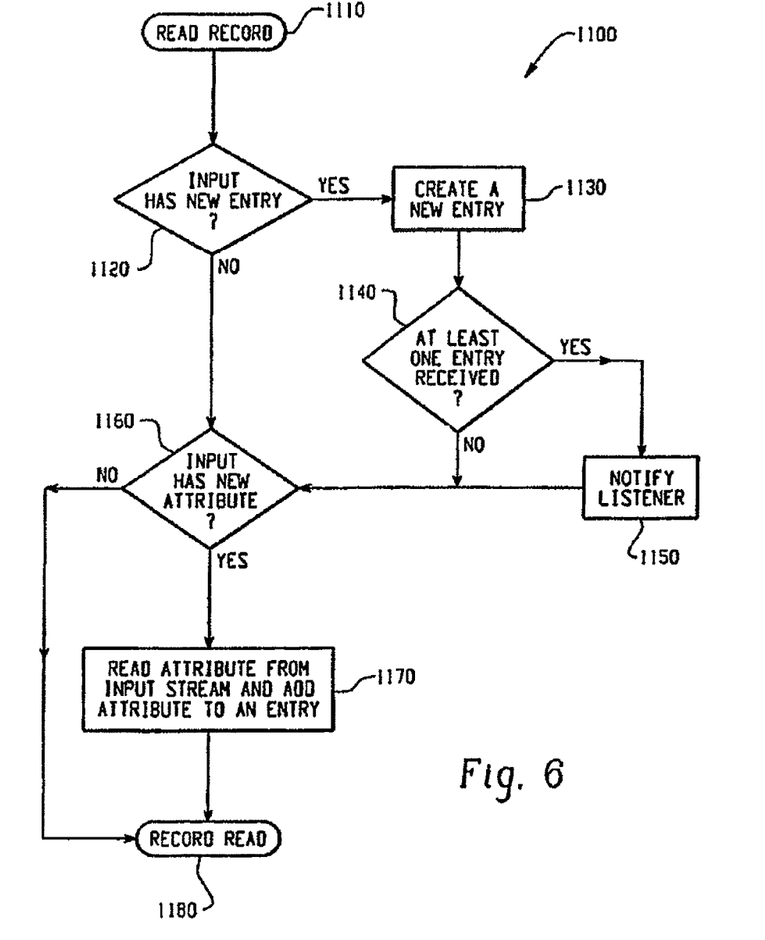
FIG. 6 provides a flow chart of an illustrative method for an LDAP client record reception method.

In step 1080, a record is read from the input stream. This step defines the record format used in the single-pass response, which is specified by either the mobile device 100 or the LDAP handler 400. An example embodiment of a method to carry out this step is illustrated in FIG. 6. After receiving the record, step 1070 ensues to ensure that a single-pass is used.

In step 1090, a listener is notified of reception of the LDAP directory information. The listener is illustratively the e-mail client program 300 executing on the mobile device 100. The listener may then automatically terminate reception of further LDAP query data if the required information has been received, or may alternatively prompt the user of the mobile device 100 for further direction.

FIG. 6 provides a flow chart 1100 of an illustrative method for an LDAP client record reception method. The method of FIG. 6 is illustrative used to read record from input step 1080 of FIG. 5.

In step 1010, a request to read a record is received. Step 1120 determines if an input signal indicates a new entry at the input. This determination can be made, for example, by reading a Boolean value from the input, written by the LDAP handler 400, which specifies that a new entry is forthcoming in the current record, or that the current record applies to the current entry. If a new entry is at the input, then step 1130 ensues, or else step 1160 ensues.

In step 1130, a new entry is created. The entry comprises the received attributes of the record.

Step 1140 determines if at least one entry has been received, i.e., if the entry has received all of its attributes. If the determination is positive, then step 1150 ensues. If the determination is negative, then step 1160 ensues.

In step 1150, the listener is notified that an entry has been received, i.e., all of the entry attributes have been received. The listener may determine if the entry is the desired LDAP directory information, and if so, no additional records need to be received and the communication can be terminated. Alternatively, the mobile device 100 can be configured to prompt the user so that the user may determine if the entry is the desired LDAP directory information.

Step 1160 determines if the input has a new attribute. This determination can be made, for example, by reading a Boolean value from the input, written by the LDAP handler 400, which specifies that a new attribute is forthcoming in the current record. If a new attribute is determined, step 1170 ensues; or else step 1180 ensues to signal that a record has been read.

In step 1170, an attribute from input stream is read and added to an entry. This can be accomplished, for example, by reading the name of the attribute from the input, written by the LDAP handler 400, then reading a Boolean value from the input signalling whether the attribute is binary or textual, and reading the binary or textual attribute from the input. The read attribute is then added to the current entry.

Step 1180 ends the record reception method and notifies a listener in the mobile device 100 that a record has been read.

Figure 8:
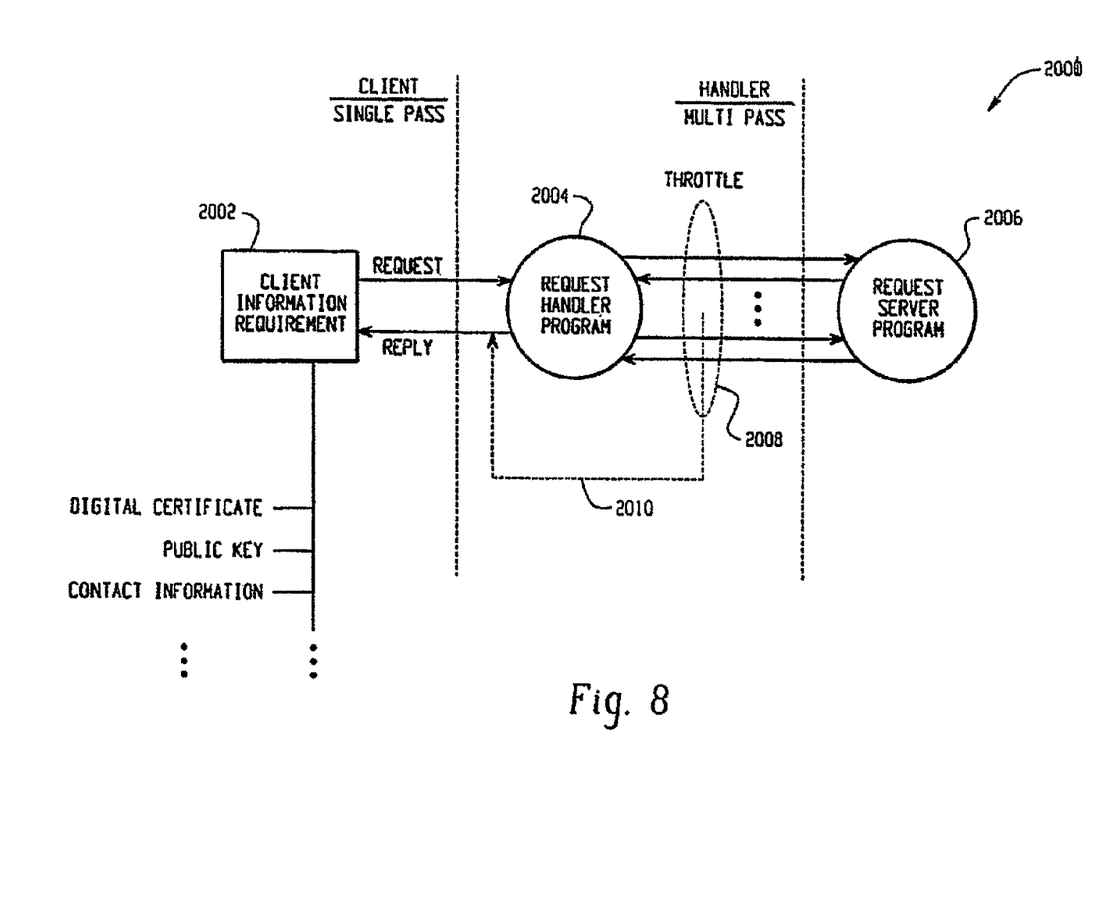
FIG. 8 provides a functional block diagram illustrating the handling of a client information request by a request handler executed at a handler system.

FIG. 8 provides a functional block diagram 2000 illustrating the handling of a client information request by a request handler. The information request illustratively is of the form of an LDAP query; however, other information requests may also be handled by a system and/or method as depicted in FIG. 8. A client system may have a client information requirement 2002 to be served by an external system, such as an LDAP server. The client information requirement 2002 may be a requirement for a digital certificate, a public key, particular contact information, or some other information requirement. The client information requirement 2002 is to be served in a single pass communication.

The client system issues a request to serve the client information requirement 2002 to a handler system, which executes a request handler program 2004. The request handler program 2004 handles the client information requirement 2002 request for the client system, and establishes a communication with a server system, or some other computing device, which executes a request server program 2006 that responds to the client information requirement 2002. The request handler program 2004 receives and monitors the multi-pass communication from the server system, and determines if the data received from the server system exceeds a client system threshold requirement, such as size or record count. If the data does exceed the client system threshold requirement, then the request handler program 2004 uses a throttle 2008 to transmit the data received up to the threshold requirement to the client system in a single-pass reply communication. If the data does not exceed the client system threshold requirement, then the request handler program 2004 transmits the data received to the client system in a single-pass reply communication.

The throttle 2008 illustratively throttles the received data by limiting the single-pass reply communication to a throttled reply 2010. The throttle reply 2010 may not include all of the data received in the multi-pass communication from the server, as illustrated by the throttled reply 2010 originating at a point within the multi-pass communication.

The throttled reply 2010 may be generated by several methods. In one embodiment, the request handler program 2004 may receive the entire multi-pass communication and store the received data at the handler system. The request handler program 2004 may then determine if the received data exceeds the client system threshold requirement. If the received data exceeds the client system threshold requirement, then the request handler program 2002 selects a subset of the data received and sends the data subset to the client system. The request handler program 2004 may optionally include refinement data to request the client system to refine the information requirement or request the client system to confirm receipt of the additional data received in the multi-pass response but not sent to the client system.

In another embodiment, the request handler program 2004 monitors the multi-pass communication to determine if the received data exceeds the client system threshold requirement. If the received data exceeds the client system threshold requirement, then the request handler program 2002 terminates the multi-pass communication and sends the received data to the client system. The request handler program 2004 may optionally include refinement data to request the client system to refine the information requirement. Of course, other methods of throttling the multi-pass communication may also be used.

While the LDAP handler 400 has been described as a software program executed on the wireless gateway 85, the LDAP handler 400 may also be a software program executed on the LDAP server 40. For example, the LDAP handler 400 can be accessible via an alternate port on the LDAP server 40. The alternate port may be designated in the URI, and thus the URI can be selected to either specify a convention, multi-pass LDAP query (e.g., "ldap://...") or a single-pass LDAP query (e.g., "mldap://..."). Furthermore, a multi-pass LDAP query may then be converted to a single-pass LDAP query by modifying the URI, e.g., adding a leading "m" to the URI "ldap://..." to obtain the URI "mldap://...". Likewise, a single-pass LDAP query may then be converted to a multi-pass LDAP query by stripping the leading "m" to obtain the URI "ldap://..."

Figure 9:
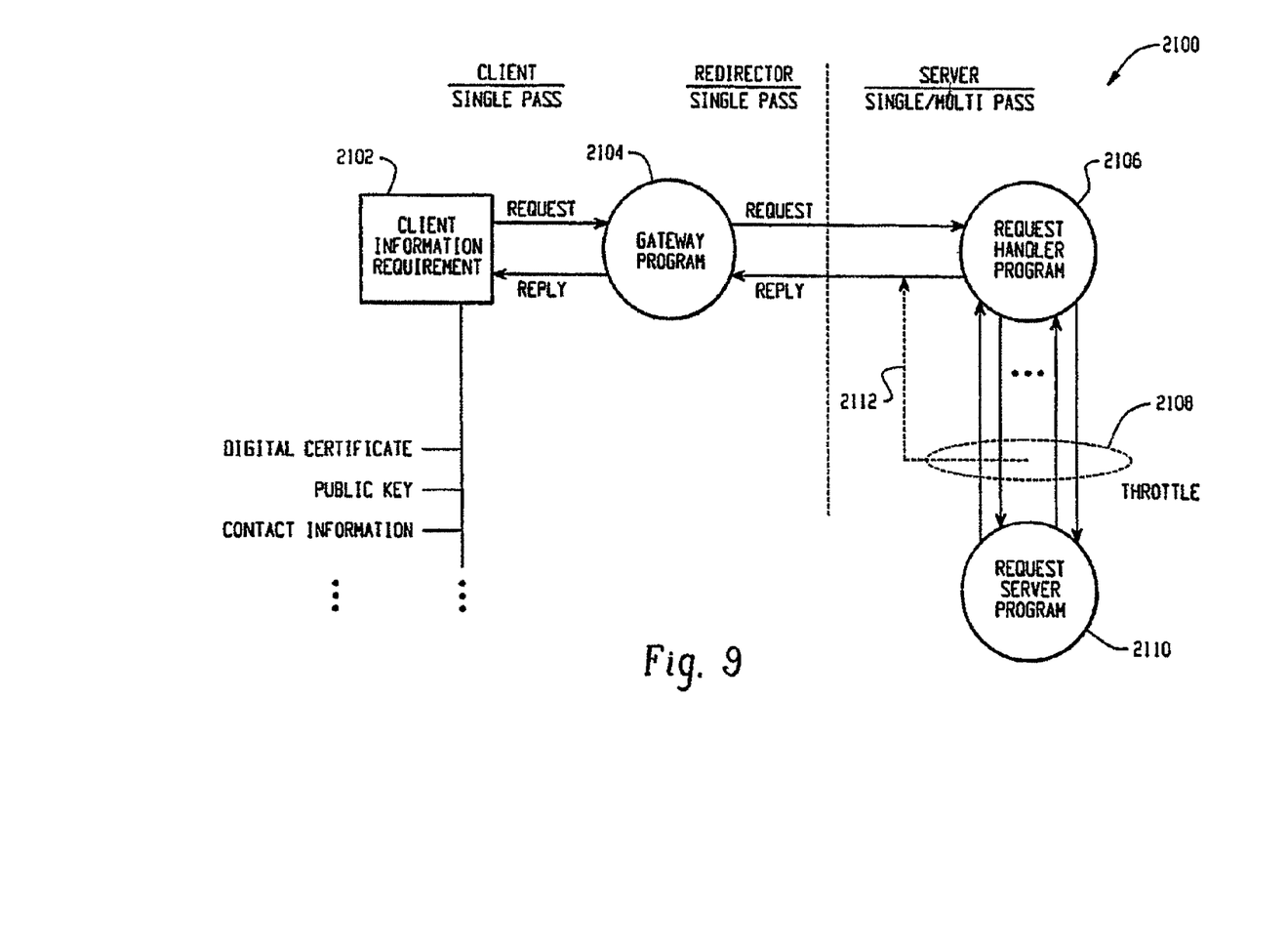
FIG. 9 provides a functional block diagram illustrating the handling of a client information request by a request handler executed at a server system.

FIG. 9 provides a functional block diagram illustrating the handling of a client information request by a request handler executed on a server system. The information request illustratively is of the form of an LDAP query; however, other information requests may also be handled by a system and/or method as depicted in FIG. 9. A client system may have a client information requirement 2102 to be served by an external system, such as an LDAP server. The client information requirement 2102 may be a requirement for a digital certificate, a public key, particular contact information, or some other information requirement. The client information requirement 2102 is to be served in a single pass communication.

The client system issues a request to serve the client information requirement 2102 to an intermediate device, illustratively a gateway program 2104 executed on the wireless gateway 85. The gateway program 2104 sends the request to a handler program 2106 executed on an LDAP server. The request handler program 2106 handles the client information requirement 2102 request for the gateway program 2104, and communicates with a request server program 2110 that responds to the client information requirement 2102. The request handler program 2106 receives and monitors the multi-pass communication from the request server program 2110, and determines if the data received from the request server program 2110 exceeds a client system threshold requirement, such as size or record count.

The client system threshold requirement may be provided to the request handler program 2106 with the request when transmitted from the gateway program 2104, or may alternatively be previously stored and accessible by the request handler program 2106.

If the data does exceed the client system threshold requirement, then the request handler program 2106 uses a throttle 2108 to transmit the data received up to the threshold requirement to the wireless gateway 85 in a single-pass reply communication. If the data does not exceed the client system threshold requirement, then the request handler program 2106 transmits the data received to the wireless gateway 85 in a single-pass reply communication. The gateway program 2104 on the wireless gateway 85 then transmits the data received from the handler program 2016 to the client system in a single pass communication.

The embodiments disclosed herein are illustrative, and other configurations and communication paths for computer systems distributed throughout one or more networks that enable the functionality of the LDAP handler system as disclosed herein may also be used.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A wireless gateway for handling on a handler system a Lightweight Directory Access Protocol (LDAP) query to an LDAP server, the gateway comprising:
    the handler system;
    a non-transitory computer readable medium having computer readable instructions stored thereon for a handler program, the handler program coded to receive LDAP query data transmitted from a client system, the LDAP query data corresponding to the LDAP query, and execute the LDAP query, receive LDAP query reply data from the LDAP server in response to the LDAP query in multiple passes, and upon completion of the execution of the LDAP query, provide the LDAP query reply data for transmission to the client system in a single pass.

2. The wireless gateway of claim 1, wherein the handler program is further coded to throttle the LDAP query reply data to generate throttled LDAP query reply data if the LDAP query reply data exceeds a threshold amount of data, and provide the throttled LDAP query reply data for transmission to the client system in a single pass.

3. The wireless gateway of claim 2, wherein the handler program is further coded to append refinement data to the throttled LDAP query reply data and provide the refinement data for transmission to the client system.

4. The wireless gateway of claim 3, wherein the handler program is further coded to generate revised LDAP query data in response to receiving the refinement data and provide the revised LDAP query data for transmission to the client system.

5. The wireless gateway of claim 3, wherein the handler program is further coded to compress the LDAP reply data and the throttled LDAP query reply data prior to transmission to the client system.

6. The wireless gateway of claim 3, wherein the LDAP query reply data comprises data records, and the threshold comprises a record count.

7. The wireless gateway of claim 6, wherein the LDAP query reply data is throttled to generate the LDAP query reply data by limiting the LDAP query reply data to the record count of data records.

8. The wireless gateway of claim 7, wherein the handler program is further coded to append refinement data to the throttled LDAP query replay data and provide the refinement data for transmission to the client system.

9. The wireless gateway of claim 1, wherein the handler system is a redirector system.

10. The wireless gateway of claim 1, wherein the LDAP query data comprises a Uniform Resource Identifier (URI).

11. The wireless gateway of claim 1, wherein the LDAP query data comprises an LDAP query for a digital certificate.

12. The wireless gateway of claim 1, wherein the LDAP query data comprises an LDAP query for a public key.

13. The wireless gateway of claim 1, wherein the handler system redirects a data item to the client system, and the handler program determines whether the data item includes encryption data and upon a determination that the data item includes encryption data generate automatic LDAP query data and execute a corresponding automatic LDAP query to the LDAP server.

14. A non-transitory computer readable medium having computer readable instructions stored thereon for a handler program executable on a handler system on a wireless gateway, the handler program coded to:
    receive LDAP query data transmitted from a client system, the LDAP query data corresponding to the LDAP query;
    execute the LDAP query;
    receive LDAP query reply data from the LDAP server in response to the LDAP query in multiple passes; and
    upon completion of the execution of the LDAP query, provide the LDAP query reply data for transmission to the client system in a single pass.

15. A method executable by at a handler system on a wireless gateway for handling a Lightweight Directory Access Protocol (LDAP) query to an LDAP server, the method comprising:
    receiving LDAP query data transmitted from a client system, the LDAP query data corresponding to the LDAP query,
    executing the LDAP query;
    receiving LDAP query reply data from the LDAP server in response to the LDAP query in multiple passes; and
    upon completion of the execution of the LDAP query, providing the LDAP query reply data for transmission to the client system in a single pass.

16. The method of claim 15, further comprising throttling the LDAP query reply data to generate throttled LDAP query reply data if the LDAP query reply data exceeds a threshold amount of data, and provide the throttled LDAP query reply data for transmission to the client system in a single pass.

17. The method of claim 16, further comprising appending refinement data to the throttled LDAP query reply data and providing the refinement data for transmission to the client system.

18. The method of claim 17, further comprising generating revised LDAP query data in response to receiving the refinement data and providing the revised LDAP query data for transmission to the client system.

19. The method of claim 17, further comprising compressing the LDAP reply data and the throttled LDAP query reply data prior to transmission to the client system.

20. The method of claim 16, further comprising compressing the LDAP reply data and the throttled LDAP query reply data prior to transmission to the client system.

* * * * *